(12) United States Patent
Guide

(10) Patent No.: US 6,591,885 B2
(45) Date of Patent: Jul. 15, 2003

(54) SUSPENSION DEVICE HAVING A VERTICAL AXIS FOR TIRE CARCASSES

(75) Inventor: Jean-Pierre Guide, Royat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/808,628

(22) Filed: Mar. 14, 2001

(65) Prior Publication Data

US 2001/0027844 A1 Oct. 11, 2001

Related U.S. Application Data

(63) Continuation of application No. PCT/EP99/06749, filed on Sep. 13, 1999.

(30) Foreign Application Priority Data

Sep. 14, 1998 (FR) .............................................. 98 11466

(51) Int. Cl.[7] .............................................. B29D 30/00
(52) U.S. Cl. ...................... 156/396; 156/406.2; 211/23
(58) Field of Search .............................. 156/406.2, 403, 156/396, 398, 421.6; 425/38, 36; 211/23, 24; 294/97

(56) References Cited

U.S. PATENT DOCUMENTS

| | | | |
|---|---|---|---|
| 1,577,664 A | | 3/1926 | Tew |
| 1,768,332 A | * | 6/1930 | Ritchey .................... 156/421.8 |
| 3,337,173 A | | 8/1967 | Soderquist et al. |
| 3,393,807 A | | 7/1968 | Sylvester et al. |
| 3,759,394 A | | 9/1973 | Hottle |
| 3,945,866 A | | 3/1976 | Rudder et al. |
| 4,236,883 A | | 12/1980 | Turk et al. |
| 4,452,655 A | | 6/1984 | Pollard |
| 4,608,219 A | | 8/1986 | Singh et al. |
| 4,637,644 A | | 1/1987 | Trethowan |
| 5,395,150 A | | 3/1995 | Imler et al. |

FOREIGN PATENT DOCUMENTS

CH      4195510      3/1967

* cited by examiner

*Primary Examiner*—Geoffrey L. Knable
(74) *Attorney, Agent, or Firm*—Baker Botts L.L.P.

(57) ABSTRACT

A device for the substantially vertical suspension of tire carcasses, which includes a plurality of articulated supports, the latter being able to bear on the inside of a tire carcass, each of said supports having a convex bearing surface capable of adopting a plurality of angular positions.

8 Claims, 3 Drawing Sheets

SUSPENSION DEVICE HAVING A VERTICAL AXIS FOR TIRE CARCASSES

This is a continuation of pending application PCT/EP99/06749, filed Sep. 13, 1999.

The subject of the present invention is a suspension device for tire carcasses; more precisely, the invention relates to a suspension device for holding uncured carcasses during manufacture of the tires, keeping their axes vertical. Hereinafter, this type of suspension will be designated by the expression "vertical suspension".

It is known that current manufacture of radial-carcass tires can be carried out in several stages: first of all, on what is called a "first-stage" machine, or alternatively a "building" machine, on which the carcass proper is constructed from bead wires and a cylinder of uncured rubbers which is shaped to make it toroidal; then, on what is called a "second-stage" machine, or alternatively a "finishing" machine, on which a cylindrical crown reinforcement, or belt, and a tread are applied to this carcass; finally, the entire unit is vulcanised in a mold.

In this method of manufacture, between the two main stages described above, it is necessary to store or possibly transport the uncured carcass from the building machine to the finishing machine, in a state in which it is highly deformable, since the rubber is in the plastic, non-vulcanised, state. Formerly, the carcasses were attached to brackets, the axes of the carcasses being horizontal, but, under the effect of their own weight they became deformed into an oval; then the carcasses were laid flat, their axes being vertical. However, with the increase in the weight of tires, it was noted that the upper sidewall sags.

Devices were therefore conceived of to avoid this deformation. Thus U.S. Pat. No. 4,452,655 describes a support means for an uncured tire carcass comprising two beads, with its axis vertical. This elliptical support means comprises four vertical plates capable of accepting a certain elastic flexion which enables them to engage beneath the upper bead in order to hold the carcass, the plates being distributed over the two minor arcs of the ellipse.

The carcass is thus held on the support by the plates bearing against said carcass beneath the upper bead, the carcass opposing radial extension of the plates. The thrust forces exerted on the carcass, which are irregularly distributed over the circumference of the carcass owing to the elliptical shape of the support means, risk causing deformation of the carcass.

Furthermore, the support means, in order to be able to accept carcasses of different dimensions, utilizes the flexibility of the plates, which indicates that carcasses of smaller dimensions are subject to greater stresses and hence greater risks of deformation. In order to avoid this phenomenon, each tire dimension requires a corresponding size of the device, which is therefore no longer multidimensional.

Finally, the operation of unloading the carcass is complicated, and cannot be automated. In fact, it is necessary to displace the carcass transversely and tilt it in order to disengage one of its sides, then to bring it back in the opposite direction in order to disengage the other side and thus free the whole carcass.

Note that "carcass" designates the raw blank that results from the operations performed in the first stage.

The present invention is directed at overcoming all these disadvantages.

SUMMARY OF THE INVENTION

In order to do this, the invention proposes a device for the substantially vertical suspension of tire carcasses, comprising a plurality of articulated supports mounted on a handling plate comprising a longitudinal axis XX' around which are distributed the supports, the latter being able to bear on the inside of a tire carcass, each of said supports also comprising a convex bearing surface of given length, each of the supports being able to adopt a plurality of angular positions, such that for each given angular position there corresponds a different radial distance between the points of said bearing surfaces which are radially farthest from the longitudinal axis XX'.

Such an arrangement permits the insertion, according to the angular positions of the bearing surfaces and hence of the radial distance between the opposed surfaces, of carcasses of a whole range of dimensions. It is not necessary to change the support, or any other element. It is therefore possible to pass from one dimension to another very rapidly and with very great ease.

Advantageously, taking as a reference the orientation of the forces of gravity, the supports and the bearing surfaces are arranged such that, at least when in the engaged position on the carcass, the points of contact between the carcass to be suspended and the supports are located above the axes of rotation of the supports. Thus, if any force tends to draw the carcass downwards, owing to the relative position of the pivot point, the action of the force tends to spread the supports apart, which increases the holding force thereof. This makes it possible, for example, to minimize the risk of accidental falling.

Preferably, a stop is able to define the axial position of the carcass to be suspended, so as to determine the location on the carcass where the bearing surfaces exert their gripping force. Preferably, this location is substantially at the level of the upper bead of the carcass. The stop is advantageously arranged so as to act in the normal axial path of travel of the carcass to be inserted.

Advantageously, the supports comprise a second, cam-shaped part which serves to control the positioning of the bearing surfaces. It is thus possible to control the positioning of the supports automatically or semi-automatically.

Advantageously, provision is also made for simultaneous bringing-together of the arms, which makes it possible to achieve a retracted position of the arms in which the latter are no longer in contact with the carcass, which permits easy and simple unloading of said carcass.

According to an advantageous variant, each support comprises a first and a second part, each axis of rotation being mounted between said first and second parts. The first part of each support is curved and bears the bearing surface on its convex side.

According to an advantageous characteristic of the invention, the actuating means comprise:

a first member which controls the rotational movement of all the supports simultaneously in the sense of bringing together the bearing surfaces of the vertical axis, and formed by a movable plate which is mounted to slide about the vertical axis and bearing projections which cooperate respectively with the second part of each support by exerting a vertical thrust on the latter, and second members controlling the rotational movement of the supports in the opposite direction and formed by springs mounted respectively on the axes of rotation of the supports.

The displacement of the movable plate which, by its thrust action on the supports, makes it possible to permit unloading of the carcass, is actuated manually by means of a rod or automatically remotely by means of a control piston-cylinder unit.

Other characteristics and advantages of the invention will become apparent on reading the examples of embodiment of the suspension device for tire carcasses according to the invention, which are given in non-limitative manner, with reference to the appended drawings.

DESCRIPTION OF PREFERRED EMBODIMENTS

Figure 1:
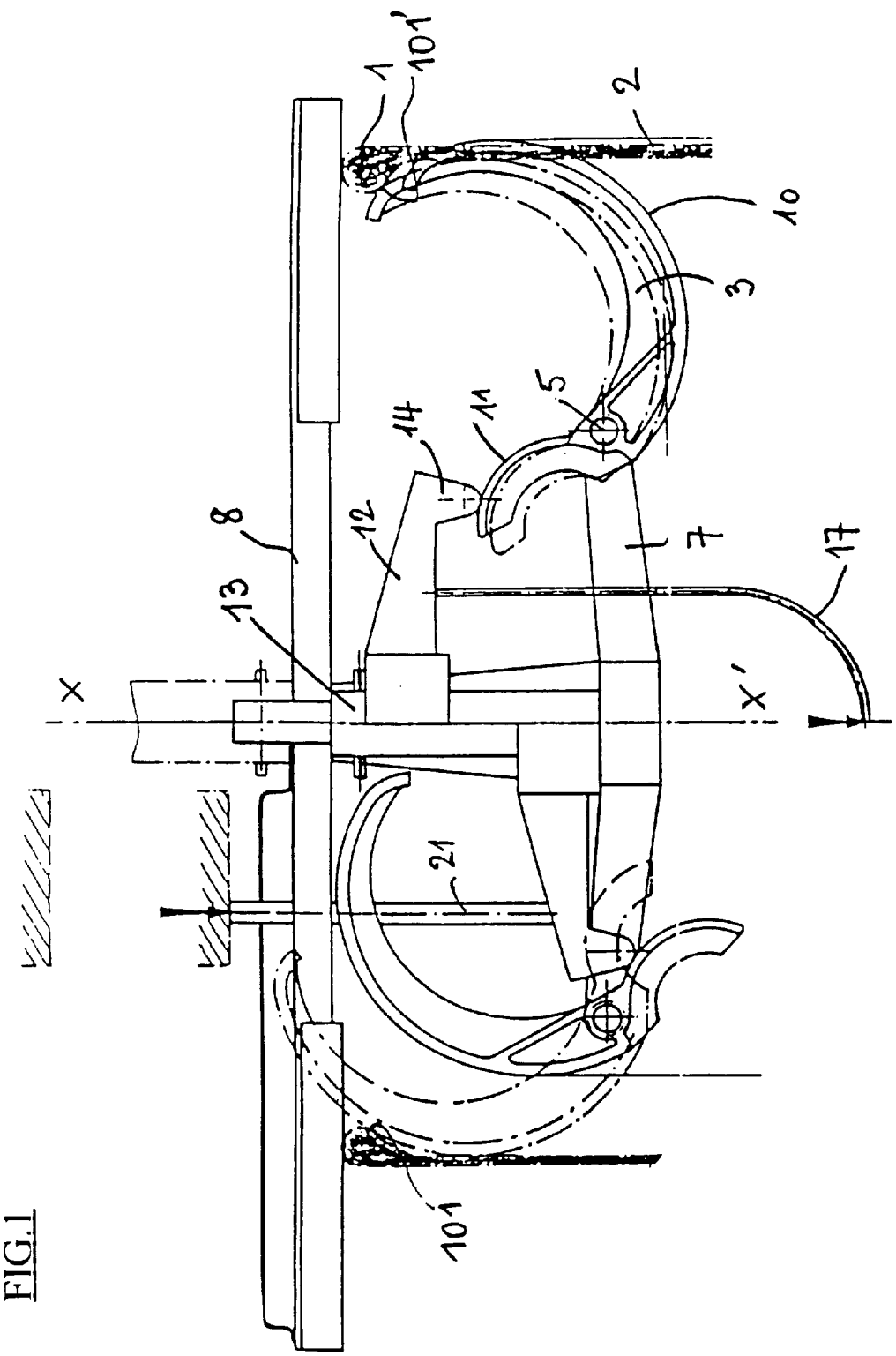
FIG. 1 is a dual view in vertical section showing two embodiments of the device in two different positions.
Figure 2:
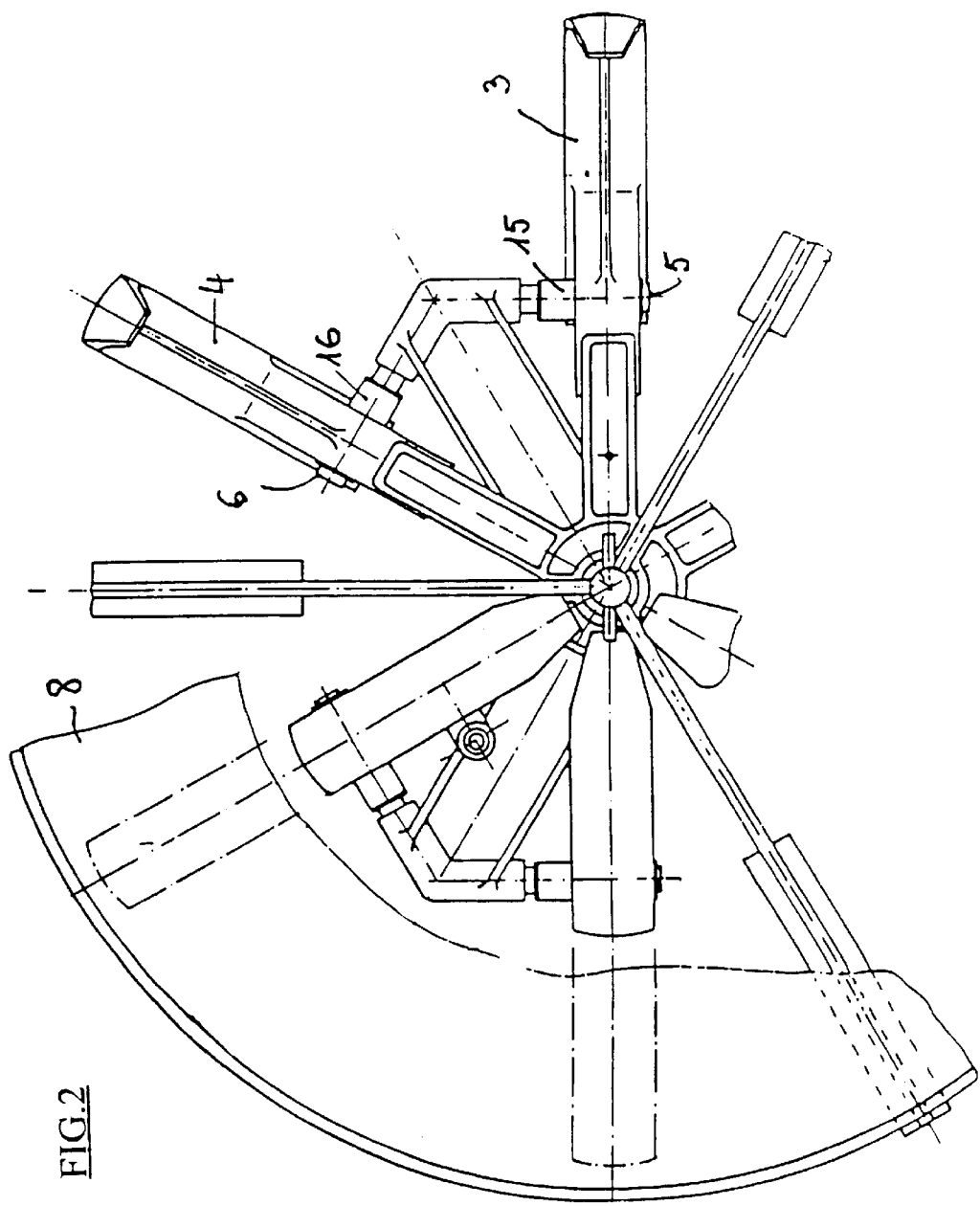
FIG. 2 is a top view, partially cut away, of the devices shown in FIG. 1.

On the right half of FIG. 1, there is shown a first embodiment of the invention: there can be seen the upper bead 1 of an uncured tire carcass 2, the axis of symmetry XX' of which is vertical. Within this carcass there are deployed six supports turned upwards and distributed about the axis XX', such as 3 and 4. According to the invention, these supports are articulated about horizontal axes, such as 5 and 6, mounted on a handling plate 7 fixed horizontally beneath a bracket. This bracket is advantageously provided with a stop plate 8 which may for example form part of a conveyor of known type, not shown.

Each support, such as 3 or 4, is formed of a rigid piece curved in the shape of an S, the first, convex, main part of which, such as 10, bears on the inside of the carcass 2 at the level of a bearing surface, while the second part, such as 11, which is smaller, is curved in the opposite direction, the axis of rotation, such as 5 or 6, being mounted substantially at the point of inflection between the two parts.

The convexity of the main part 10 makes it possible to vary the radial positioning of the bearing surface according to the dimension of the carcass, and hence to have a multidimensional suspension device. In fact, in the left part of FIG. 1, the carcass shown has a smaller diameter than that of the carcass shown on the right of the figure, and it can clearly be seen that the bearing surface 101 (on the left of FIG. 1) is not located at the same level of the convex part as the bearing surface 101' (on the right in FIG. 1). On the other hand, in both cases, these bearing surfaces 101, 101' exert a force substantially at the same location on the respective carcasses, that is to say at the level of their upper beads, due in particular to the stop plate 8 which limits the axial position of the carcass, as will be seen in the rest of the description.

Preferably, the suspension device comprises a vertically movable plate 12, for example one which slides on an axial tube 13, provided with projections, such as 14, capable of simultaneously pushing on the parts 11 of the supports 3, 4.

The convexity of the smaller part 11 makes it possible to limit the space taken up by the device by forming a cam which transforms the translational displacement of the movable plate 12 into pivoting of the supports 3, 4 in geared-down manner. Of course, it is also possible to select other forms for producing the smaller part 11.

Each support 3 or 4 is provided with a return spring, for example a torsion spring such as 15 or 16, mounted about the axis of rotation 5 or 6, in order to place the support in the hooking position for the carcass.

Finally, a vertical rod 17 integral with the movable plate 12 makes it possible to pull the latter manually downwards to unhook the carcass.

Figure 3A:
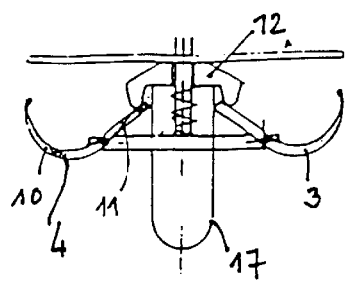
FIGS. 3A to 3D are diagrammatic representations of the operations of hooking and unhooking of a carcass for the manual method of implementing the invention shown in FIG. 1.

Referring to FIGS. 3A, B, C and D, in which the part 11 of the supports has been shown in planar form, the operation of the device which is the subject of the invention will now be explained.

In FIG. 3A, the device is in the ready position: there is no carcass, the rod 17 is free, and the return springs hold the supports 3, 4 spread apart.

Figure 3B:
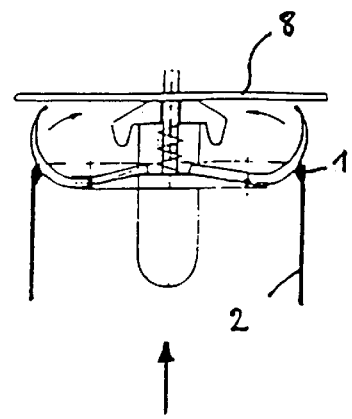

In FIG. 3B, a carcass 2 is presented vertically beneath the device; as it rises, its upper bead 1 pushes away the supports 3, 4 which fold up towards the axis of symmetry, opposing the forces of the return springs. The axial rising of the carcass is limited by the stop plate 8.

Figure 3C:
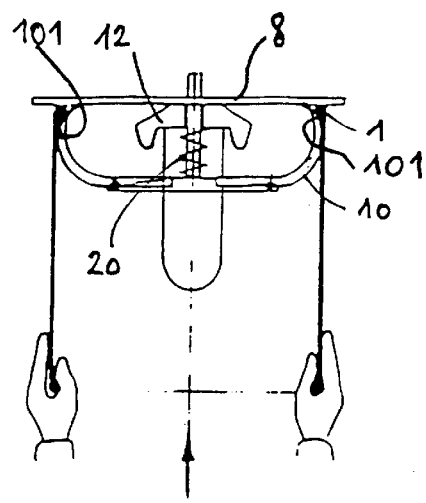

In FIG. 3C, the upper bead 1 has passed over the convex part 10 of the supports 3, 4 and has come up against the stop plate 8, and the return springs tend to apply the supports against the inside of the carcass 2. The upper bead of the carcass passes over the point of contact with each convex part 10. Note that these points of contact are above the axes of rotation 5, 6 of the supports 3, 4. Once the carcass has been released, the weight of the latter tends to aid the gripping which is effected.

Figure 3D:
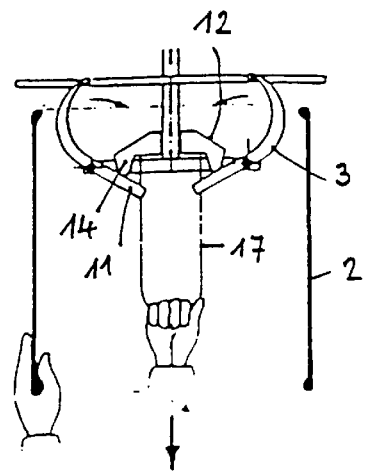

In FIG. 3D, the unhooking of the carcass is shown: by pulling the rod 17 downwards, the movable plate 12 is lowered, the projections 14 of which plate bear on the parts 11 of the supports 3, 4, tilting and bringing together the bearing surfaces 101 of the convex parts 10 towards the axis of symmetry, the effect of which is to release the carcass 2.

There can be seen in these FIGS. 3 a spring 20 which can raise the movable plate 12 in the absence of any other stress: this disengages the parts 11 of the supports 3, 4 which can thus tilt more freely towards the outside under the action of the return springs, or possibly under the sole effect of the weight of the parts 10 and not add any additional force to that due to the weight of the carcasses.

Returning now to FIG. 1, there is shown on the left half another embodiment of the invention in which the action of the rod 17 is replaced by that of a pneumatic piston-cylinder unit 21; this piston-cylinder unit can be actuated remotely, which makes it possible to automate without difficulty the operations of transfer of the uncured carcasses, which have been described above. Such a piston-cylinder unit can be fixed to the unloading station for the carcasses, the conveyor then displacing the handling plates 7 in front of it.

Furthermore, it can be seen in FIG. 1 that the carcasses shown in the two halves of the figure are not of the same diameter, whereas the different parts of the suspension device are identical (with the exception of the control of the movement of the movable plate 12); this illustrates one of the advantages of the invention, namely the possibility of using the same device for an entire range of dimensions of tires, for example, for dimensions of 12 to 16 inches.

I claim:

1. A device for the substantially vertical suspension of generally cylindrical uncured blanks for tire carcasses, comprising:

a handling plate having a substantially vertical longitudinal axis;

a plurality of supports mounted on said handling plate at spaced angular positions about said longitudinal axis, each of said supports having (1) a radially outer, relative to said longitudinal axis, part defining a convex bearing surface of given length for bearing against the generally cylindrical inner surface of an uncured blank for a tire carcass, and (2) being movable to different angular positions about a substantially horizontal axis of rotation such that the radial distance between said longitudinal axis and the radially outermost point on said convex bearing surface can be varied over a range of distances by varying the angular position of said support about said axis of rotation to establish engagement between said radially outermost point with the inner surface of uncured blanks of different internal dimensions;

said convex bearing surfaces on said supports extending radially outwardly and axially upwardly relative to said axes of rotation; and said axes of rotation of said supports are located vertically lower than the points of engagement of said convex bearing surfaces with the generally cylindrical inner surface of the uncured blank at least when the blank is in an axial position to be suspended on the device, such that forces tending to urge the blank vertically downward tend to cause said supports to rotate about said axes of rotation in a direction to increase the radial distance between said points of engagement and said longitudinal axis, thereby increasing the holding force of said supports on the blank.

2. A suspension device according to claim 1, further comprising a stop which defines said axial position of the blank to be suspended.

3. A suspension device according to claim 1, which each support further comprises a cam-shaped part which controls the position of the convex bearing surface of the respective support relative to said longitudinal axes.

4. A suspension device according to claim 3, in which each cam-shaped part is curved in the opposite direction to the curvature of the convex bearing surface of the respective support, such that each support is curved in an S-shape, and each axis of rotation is mounted substantially at the point of inflection between the cam-shaped part and the radially outer part defining the convex bearing surface.

5. A suspension device according to claim 4, which the cam-shaped part of each support is of smaller radial dimension than the radially outer part of the support.

6. A suspension device as set forth in claim 3, further comprising a plate movable along said longitudinal axis to control the cam-shaped parts by imparting translational displacement thereto substantially parallel to said longitudinal axes.

7. A suspension device according to claim 6, in which each cam-shaped part is configured to transform the translational displacement substantially parallel to said longitudinal axis into pivotal movement of the supports about said axes of rotation.

8. A suspension device according to claim 1, further comprising actuating means for controlling the rotational movement of the supports about said axes of rotation so as substantially simultaneously to move the convex bearing surfaces thereof toward or away from the longitudinal axis.

* * * * *

UNITED STATES PATENT AND TRADEMARK OFFICE
CERTIFICATE OF CORRECTION

PATENT NO.    : 6,591,885 B2  
DATED         : July 15, 2003  
INVENTOR(S)   : Guide, Jean-Pierre It is certified that error appears in the above-identified patent and that said Letters Patent is hereby corrected as shown below:

<u>Column 6,</u>  
Line 5, "curvation" should read -- curvature --

Signed and Sealed this

Fourteenth Day of October, 2003

JAMES E. ROGAN  
*Director of the United States Patent and Trademark Office*